United States Patent [19]

Hare et al.

[11] 4,436,984

[45] Mar. 13, 1984

[54] ELECTRIC ARC DISCHARGE APPARATUS

[75] Inventors: Alan L. Hare; Allan P. George, both of Cleveland, England

[73] Assignee: Tioxide Group PLC, Cleveland, England

[21] Appl. No.: 442,715

[22] Filed: Nov. 18, 1982

[30] Foreign Application Priority Data

Dec. 10, 1981 [GB] United Kingdom ............... 8137291

[51] Int. Cl.$^3$ ................................................ H05B 7/18
[52] U.S. Cl. ................................... 219/383; 219/121 P
[58] Field of Search .................... 219/121 P, 383, 384; 313/156, 231

[56] References Cited

U.S. PATENT DOCUMENTS 3,629,553 12/1971 Fey et al. ........................ 219/383
4,013,867 3/1977 Fey ............................... 219/121 D

FOREIGN PATENT DOCUMENTS 360288 10/1931 United Kingdom .
1090000 4/1966 United Kingdom .
1185501 4/1967 United Kingdom .
1190382 8/1967 United Kingdom .
1472497 5/1977 U.S.S.R. .

Primary Examiner—Volodymyr Y. Mayewsky
Attorney, Agent, or Firm—Schuyler, Banner, Birch, McKie & Beckett

[57] ABSTRACT

This relates to electric arc discharge apparatus including at least two pair of electrodes and a single power source which comprises a multi-phase transformer, arc stabilization means and two or more rectifier bridges. Each rectifier bridge provides a pair of electrical power outputs to supply power to a respective pair of electrodes.

The invention enables the multi arc system to be employed using a single power source and is of particular use in heating gas to be used in the oxidation of titanium tetrachloride for the production of titanium dioxide pigments.

9 Claims, 1 Drawing Figure

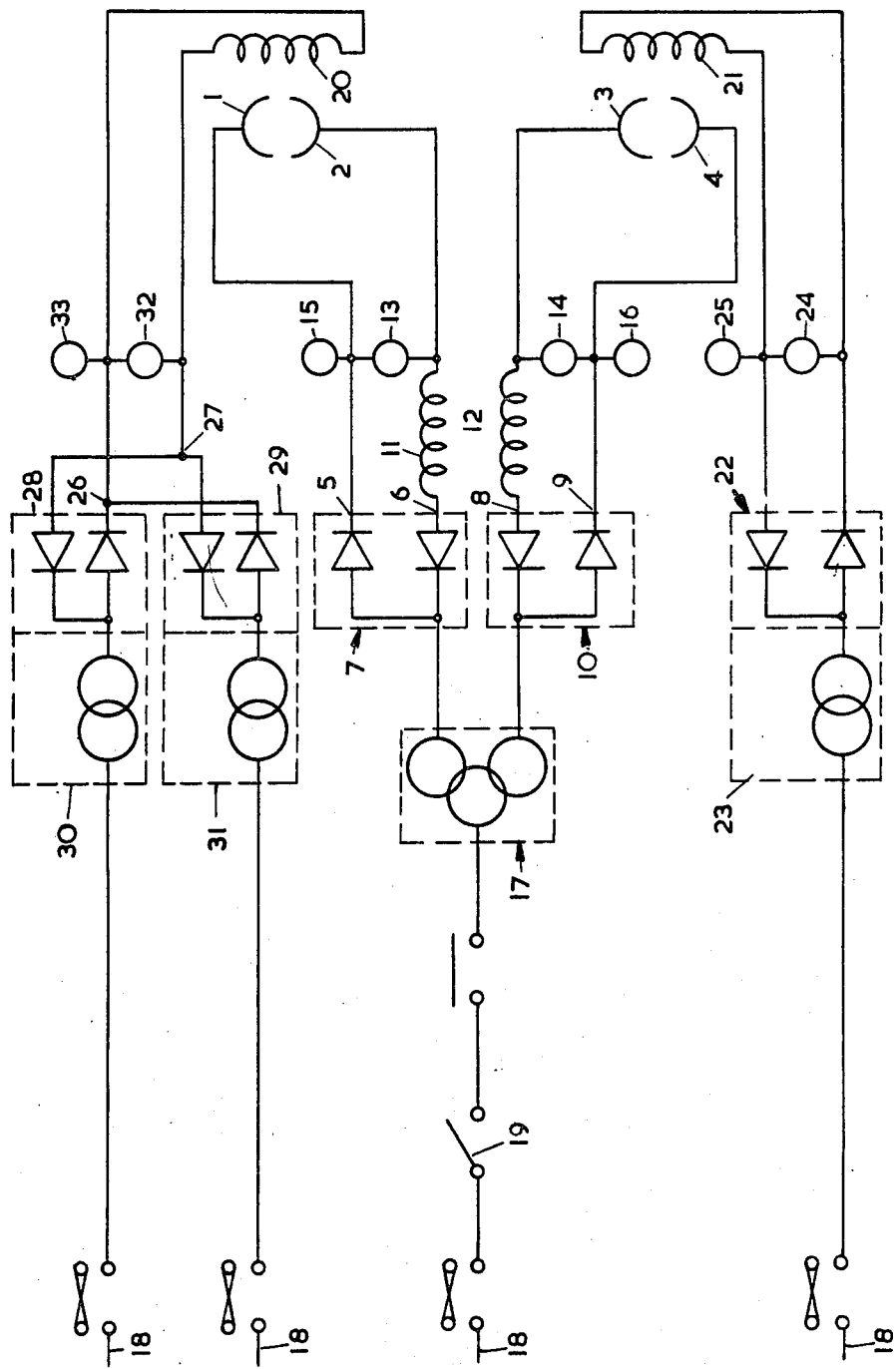

ELECTRIC ARC DISCHARGE APPARATUS

This invention relates to electric arc discharge apparatus and particularly to apparatus capable of industrial exploitation in chemical processes.

According to the present invention an electric arc discharge apparatus comprises a power supply comprising a multi-phase transformer, arc stabilisation means and two or more rectifier bridges each bridge providing a pair of power outputs, a first pair of electrodes with one of said first pair of electrodes electrically connected to one power output of a first selected pair of power outputs and the other of said first pair of electrodes electrically connected to the other power output of said first selected pair of power outputs and a second pair of electrodes with one of said second pair of electrodes electrically connected to one power output of a second selected pair of powers outputs different from the said first selected pair of power outputs and the other of said second pair of electrodes electrically connected to the other power output of said second selected pair of outputs.

Because of the very short response time demanded of a power supply to maintain stable operation of one arc it had been believed each arc would require its own power supply with separate arc stabilisation means because one stabilisation means would not be capable of responding to the greater unpredictable dynamic loads of two or more arcs particularly if the ability to initiate and extinguish individual arcs independently of the others is required.

The present invention provides a means for using only one power supply and one stabilisation means for a multiplicity of arcs, allows for separate arc initiation without ancillary power supplies at times selected by the operator.

In essence the power supply comprises a transformer connectable to a source of a.c. mains electricity and being a multi-phase transformer. The tramsformer must be capable of producing the output of the required voltage and current characterisitcs required for the arcs after rectification.

Typically the output to the arcs can have a voltage of up to 100K volts and 100,000 amps and, depending on the particular purpose of use the output will have a voltage within the range 1K volts to 10K volts and amperage within the range 100 amps to 10,000 amps.

The multi-phase output from the transformer being alternating current necessitates the provision of a rectifier bridge to produce direct current at the output. Each bridge provides power to a pair of outputs.

In accordance with the present invention the power supply includes stabilisation means for the arc and such power supplies include those having series reactor control and those including saturable reactor control.

Alternatively the stabilisation means and rectifier bridges can be combined as a silicon controlled rectifier (thyristor) bridges for which additional inductance may be desirable to ensure long term arc stability.

Each pair of power outputs provides an electric potential difference to a pair of electrodes between which it is desired to generate an arc. The apparatus according to the invention includes at least two such pairs of electrodes to generate two arcs. One electrode of the first pair of electrodes is connected electrically to one power output of a selected pair of outputs and the other electrode is connected to the other power output of the selected pair of outputs.

Similarly the second pair of electrodes is connected to the second selected pair of power outputs. Each additional pair of electrodes is connected to an independent additioned pair of power outputs so that each arc has in effect its independent power outputs all of which are, however, supplied by a single power supply.

The electrodes may have any desirable form and if desired, may be constructed so that the arc may be blown i.e. formed into a plasma in a stream of a suitable gas passing between the electrodes of a pair. The electrodes of a pair may be tubular and mounted in line. If desired the electrodes may be provided with suitable cooling means such as the provision for the flow of cooling water and also with means to generate an electric field to rotate the arc root to minimise localised erosion of an electrode.

The apparatus of the invention is of particular usefulness in the provision of a pair of electric arcs to heat gas streams in chemical reactions such as in the vapour phase oxidation of say a metal halide to produce a metal oxide. A typical example of such use is the heating of a stream of oxygen to oxidise titanium tetrachloride to produce pigmentary titanium dioxide.

One form of apparatus constructed in accordance with the invention will now be described by way of example only with reference to the attached drawing which shows a typical layout and components.

In the drawing there is shown diagrammatically represented a first pair of electrodes 1, 2 and a second pair of electrodes 3, 4. Electrodes 1, 2 are connected respectively to a pair of outputs 5, 6 of a rectifier bridge 7. Electrodes 3, 4 are connected respectively to a pair of outputs 8, 9 of a second rectifier bridge 10. Chokes 11, 12 are connected respectively between electrodes 2 and output 6 and between electrode 3 and output 8. Voltmeters 13 and 14 are provided to measure the voltage difference between the outputs of each pair and ammeters 15 and 16 are included to record the current flow.

The rectifier bridges 7, 10 are provided with power from a single saturable reactor controlled transformer 17 which is connected to a three-phase mains supply 18 through switch gear 19.

Each pair of electrodes is provided with a field coil 20, 21. Field coil 21 is supplied with power through a rectifier bridge 22 via a field transductor 23 supplied by means power 18. Voltmeter 24 and ammeter 25 are also connected in the field coil circuit.

The other field coil 20 is connected to a pair of outputs 26, 27 from a coupled pair of rectifier bridges 28, 29 each supplied with power from transductors 30, 31 connected to mains power 18. Voltmeter 32 and ammeter 33 are also included in the circuit. Equally conveniently one transductor can be used rather than the two 30, 31 shown.

In an example the electrodes were hollow and provided with means to inject a gas through the hollow electrodes to produce blown arcs. The electrode pair 1, 2 had an anode with a 9.5 mm diameter bore and the electrode pair 3, 4 had an anode with a 15.5 mm diameter bore.

The arc between electrodes 3 and 4 was initiated by applying a feed of oxygen with helium and sufficient voltage to strike the arc. The other arc was initiated in a similar manner and the flow of oxygen increased to 18.8 normal cubic meters per hour with the current increased to 100 amps at approximately 350 volts. Helium was only used to initiate the arcs.

The first arc voltage was increased to about 585 volts at a current of 100 amps at an oxygen flow rate of 21.5 normal cubic meters per hour.

The arcs were maintained at these conditions for almost 8 hours.

This example clearly shows that the apparatus of the invention can be used to maintain arcs between dissimilar electrode pairs under different conditions of electrical power from one power source. Naturally similar electrode pairs can be operated easily under similar conditions of electrical power.

In another example the saturable reactor transformer 17 was replaced by a single transformer series reactor. The first arc was initiated with an oxygen flow of 50 normal cubic meters per hour and the second arc was initiated with oxygen flow set at 45 normal cubic meters per hour. After initiation the oxygen flow to both units was increased to 170 normal cubic meters per hour to give an arc voltage of 1350 volts. The arc ran for over 20 hours without any apparent decrease in arc stability compared with only one arc device per power supply.

We claim:

1. An electric discharge apparatus which comprises a power supply comprising a multi-phase transformer, arc stabilisation means and two or more rectifier bridges each bridge providing a pair of power outputs, a first pair of electrodes with one of said first pair of electrodes electrically connected to one power output of a first selected pair of power outputs and the other of said first pair of electrodes electrically connected to the other power output of said first selected pair of power outputs and a second pair of electrodes with one of said second pair of electrodes electrically connected to one power output of a second selected pair of power outputs different from the said first selected pair of power outputs and the other of said second pair of electrodes electrically connected to the other power output of said second selected pair of outputs.

2. Apparatus according to claim 1 in which the said transformer provides each pair of outputs with electric power of up to 100K volts and up to 100,000 amps.

3. Apparatus according to claim 2 in which said transformer provides each pair of outputs with electric power of from 1K volts to 10K volts and from 100 amps to 10,000 amps.

4. Apparatus according to claim 1 in which said power supply is one having series reactor control.

5. Apparatus according to claim 1 in which said power supply is one having saturable reactor control.

6. Apparatus according to claim 1 in which the stabilisation means and said rectifier bridges are combined in the form of silicon controlled rectifiers (thyristor) bridges.

7. Apparatus according to claim 1 in which each electrode of a pair is tubular in shape and mounted in line.

8. Apparatus according to claim 1 in which said electrodes are provided with cooling means.

9. Apparatus according to claim 1 in which said electrodes are provided with means to generate an electric field to rotate the arc root around said electrode when in operation.

* * * * *